(No Model.)

E. P. BROWNELL.
METHOD OF MANUFACTURING SPOOLS.

No. 384,677. Patented June 19, 1888.

Witnesses.
Chas. R. Butt,
A. J. Stewart

Inventor.
Emerson P. Brownell
by Church & Church
his Attorneys.

UNITED STATES PATENT OFFICE.

EMERSON P. BROWNELL, OF BEEBE PLAIN, QUEBEC, CANADA.

METHOD OF MANUFACTURING SPOOLS.

SPECIFICATION forming part of Letters Patent No. 384,677, dated June 19, 1888.

Application filed February 10, 1888. Serial No. 263,568. (No model.)

*To all whom it may concern:*

Be it known that I, EMERSON P. BROWNELL, of Beebe Plain, Province of Quebec, Dominion of Canada, a subject of the Queen of Great Britain, have invented certain new and useful Improvements in the Method of Manufacturing Spools; and I do hereby declare the following to be a full, clear, and exact description of the same, reference being had to the accompanying drawings, forming a part of this specification, and to the figures and letters of reference marked thereon.

My present invention has for its object to provide an improved method of manufacturing spools for thread or bobbins and similar articles from wood or similar material; and it consists in a certain manner of procedure, hereinafter described, and the particular points of novelty, both in individual steps and complete method, being clearly pointed out in the claims at the end of the specification.

The drawings consist of a series of views showing the blank after being subjected to the various steps of the method.

Figure 1:
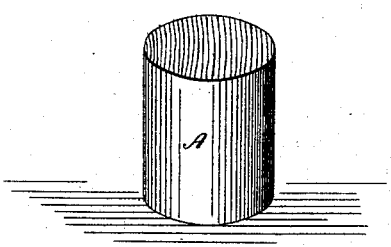
Figure 2:
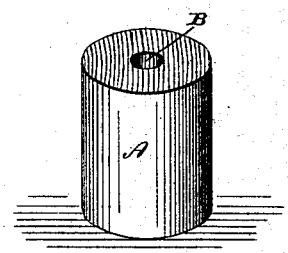
Figure 3:
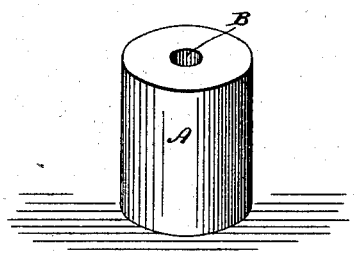
Figure 4:
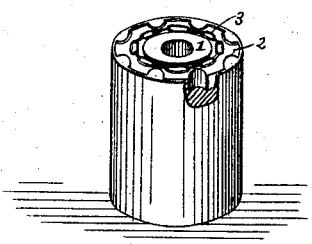
Figure 5:
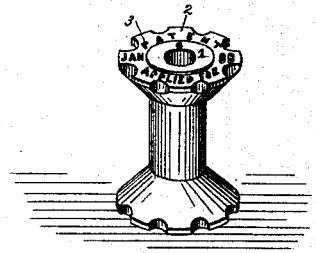

Figure 1 shows the rough blank as it is supplied to a machine capable of carrying out the method; Fig. 2, a view after being bored; Fig. 3, a view after being faced; Fig. 4, a view, partly in section, with the heads embossed and cut, as presently described; Fig. 5, a view of the completed spool.

Similar letters of reference in the several figures indicate the same parts.

In carrying out my improved method I first provide a suitable blank, A, preferably approximately cylindrical, of wood, composition, or any suitable material, and by means of suitable boring-tools bore a hole, B, longitudinally through it, as in Fig. 2. As the ends of the bored blank are still comparatively rough, having the saw-marks upon them, and in order to prepare the blank for the subsequent operations, the ends are now faced by any suitable facing-tool, so as to leave them smooth and true, as in Fig. 3.

After the blanks are bored and faced, as above described, (though not necessarily in the order mentioned, nor indeed is it essential that they be faced at all, as the original state in which supplied may be sufficient,) I force in from opposite ends of the blank, knives that cut into the material of the blank longitudinally a distance a little greater than the thickness of the flanges to be formed at the ends, as shown in section in Fig. 4, to shape the ends, and preferably at the same time emboss the ends of the spool with suitable designs or lettering in either relief or intaglio, as may be desired—in the present instance, 1 representing the material of the blank unacted upon, 2 the portions pressed down, and 3 those in relief, shown as consisting of suitable lettering in the drawings.

In the present instance the peripheries of the ends of the spool-blank cut by the knife are shown as corrugated somewhat; but it is obvious that round spool ends can be cut as well. Either or both ends of the spool can be embossed; but I prefer to ornament them both.

After cutting the ends of the blank, as above described, I turn it down at the center, as in Fig. 5, to form the ordinary-shaped spool with embossed and corrugated ends and centrally-tapering center or thread-holding portions.

The centers between which the blank is held while being turned, as in the step before mentioned, are preferably provided with dies, in either intaglio or relief, adapted to grip the blank on the unacted-upon portions 1 and form further designs or numbers thereon, as shown in Fig. 5, and while I regard this as a desirable it is by no means an essential feature of my method.

By first boring the spool-blank I am enabled to provide a means for adapting it to be more readily and accurately positioned and held by the subsequently-acting tools than would be the case were solid blanks acted upon and afterward bored, as the tools that are adapted to act upon the blank can be positioned with reference to the center rather than an irregular outline.

The step of splitting the ends of the blank a distance equal to or greater than the thickness of the flanged ends before the spool is turned is a very important and valuable one, in that it not only enables me to provide a turned spool with corrugated or scalloped ends, which could not be done by methods heretofore in use; but all danger of chipping the narrow flanges at the ends by the "chattering" of the tool employed to turn down the central portion is avoided, and also the turning-tool need be only a narrow one, located wholly inside the flange, obviating all danger of having the tool strike the chuck or holding device.

While I prefer to simultaneously cut and emboss the ends of the blank, the former operation might be performed either before or after the other; but in a machine adapted to carry out the method herein described, forming the subject-matter of another application, these operations are performed by one mechanism—hence the description herein; but I do not desire to be understood as confining myself to this arrangement, and for the same reason I have described the centers for rotating the blank for the finishing turning as also arranged to stamp figures or characters on the spool ends, the die-centers entering the wood and operating to securely hold it.

It will be understood that, instead of cutting the ends first and then turning the body of the spool down to proper shape on lines intersecting the cuts, I might in some instances turn the blank down to the correct size at the center and then cut in and shape the spool ends and either simultaneously or subsequently ornament the ends, as described; but this is generally not desirable, for the reason that it is better to have the blank-body solid when the ornamenting-dies operate upon it, as considerable pressure is required to give the proper stamp.

It will be further noted that by simultaneously cutting and embossing or stamping the ends, as the cutter is tubular and must necessarily operate first, the material compressed in the stamping operation is prevented from spreading laterally and all liability of splitting the blank is obviated.

From the above description it will be seen that spools can be made from blocks cheaply, with the utmost economy of space and time, and in a shape different from any other practicable method—that is to say, a turned spool with corrugated or scalloped ends.

An infinite number of shapes can be given the ends of the spools to designate the goods of the thread-maker or the retailer, and the lettering or embossing in the spools may be in any pattern desired.

Having thus described my invention, what I claim as new is—

1. The improved method of making spools and similar articles, consisting in first cutting longitudinally into the blank to give the proper circumferential shape to the ends and then cutting the central body portion away to less diameter than the ends, substantially as described.

2. The improved method of making spools and similar articles, consisting in cutting longitudinally into the blank from opposite directions distances equal to or greater than the thickness of the edges of the flanges and subsequently cutting the central body portion of the spool down on lines intersecting said cuts to a diameter less than that of said ends, substantially as described.

3. The improved method of making spools and similar articles, consisting in cutting longitudinally into the ends of the blank from opposite directions to give the proper circumferential shape thereto and simultaneously embossing or stamping suitable figures on the face of such ends, substantially as described.

4. The improved method of making spools and similar articles, consisting in forcing annular cutters into the ends of the blank from opposite directions, to give the same the proper circumferential shape, and embossing or stamping suitable figures on the faces of such ends while within the cutters, substantially as described.

5. The improved method of making spools, consisting in first boring the blank, then cutting longitudinally into it to shape the ends and stamping figures on the faces of said ends, and subsequently turning the central body portion down on lines intersecting the cuts made from the ends to a diameter less than such ends, substantially as described.

6. The herein-described method of making spools and similar articles, consisting, first, in boring the blank; second, facing or turning the ends; third, stamping designs in the ends, or either of them, and simultaneously cutting longitudinally into the blank to shape the ends, and, finally, turning the spool-body down to proper shape on lines intersecting the cuts previously made, as set forth.

7. The herein-described step in the manufacture of spools and similar articles, consisting in cutting longitudinally into the blank by means of a circumferentially-corrugated die, thereby shaping the ends, and subsequently turning the body of the spool down on lines intersecting the cuts previously made.

EMERSON P. BROWNELL.

Witnesses:
HUGH S. WRIGHT,
CHAS. M. THOMAS.